March 20, 1962 — W. M. WILLIS — 3,026,128
REMOTE OPERATIONAL JOINT COUPLING
Filed April 21, 1960 — 3 Sheets-Sheet 1
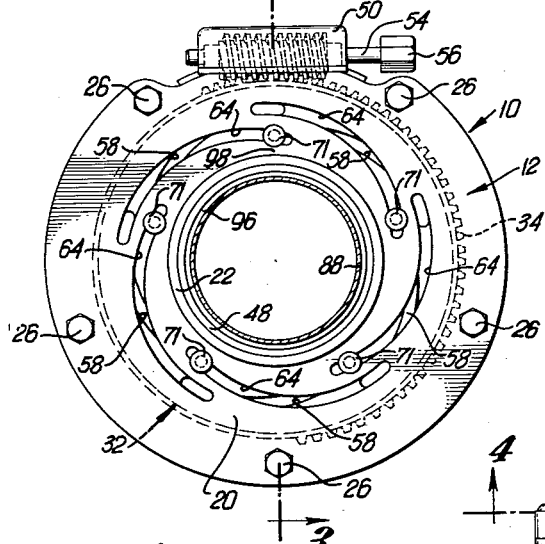
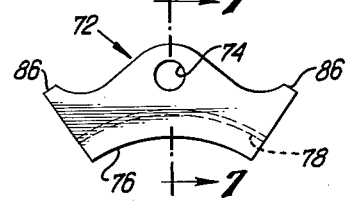
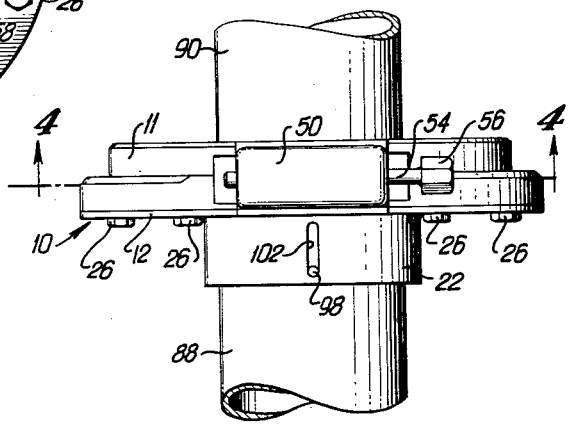
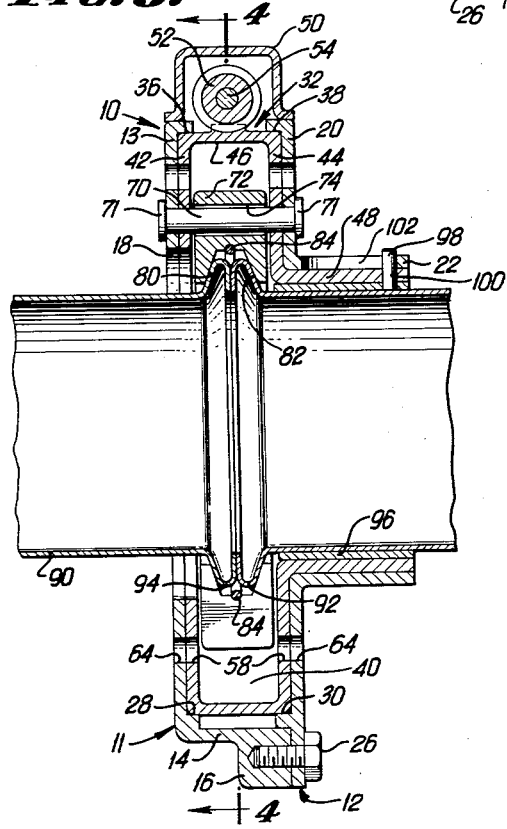
INVENTOR.
WILLIAM M. WILLIS
BY Huebner & Worrel
ATTORNEYS.

March 20, 1962  W. M. WILLIS  3,026,128
REMOTE OPERATIONAL JOINT COUPLING
Filed April 21, 1960  3 Sheets-Sheet 2
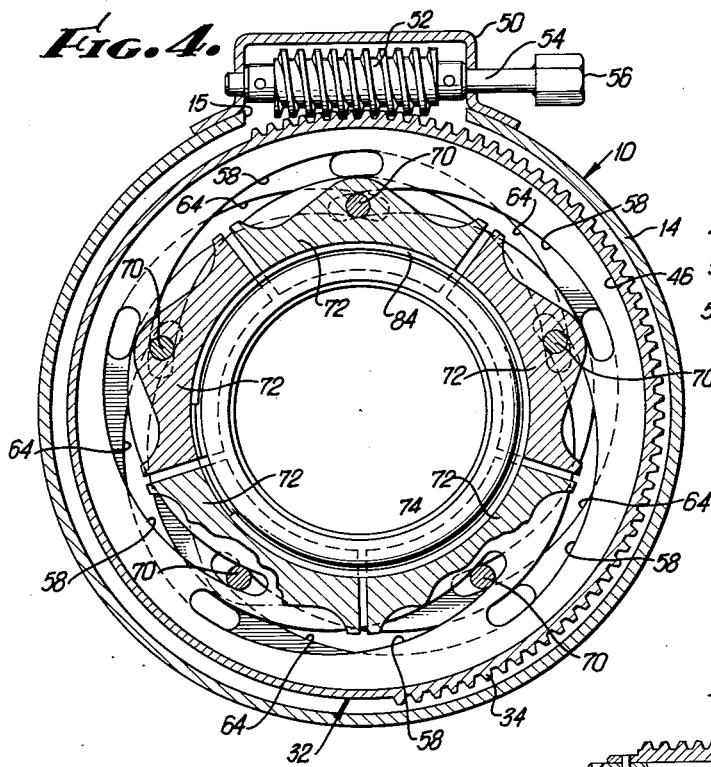
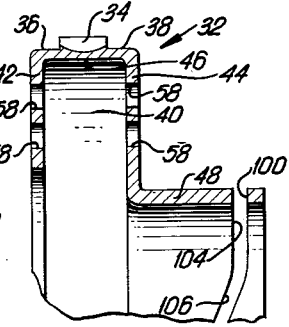
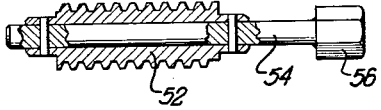
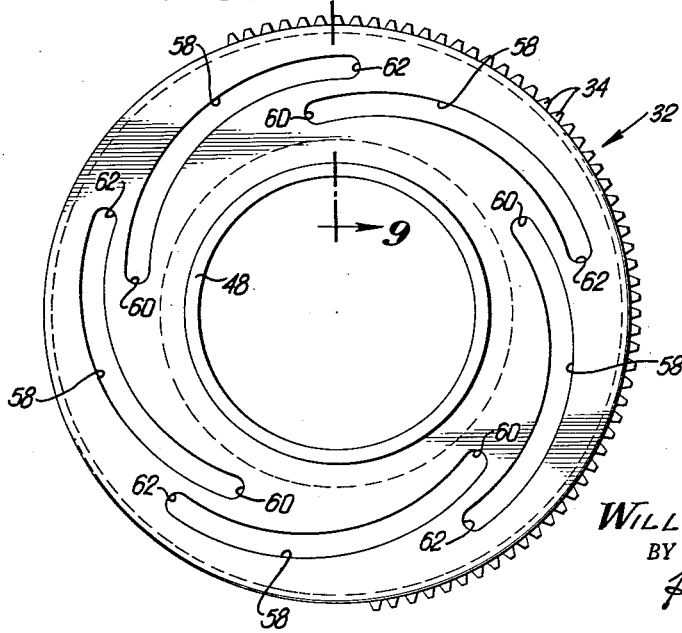
INVENTOR.
WILLIAM M. WILLIS
BY
Huebner & Worrel
ATTORNEYS.

March 20, 1962 W. M. WILLIS 3,026,128
REMOTE OPERATIONAL JOINT COUPLING
Filed April 21, 1960 3 Sheets-Sheet 3
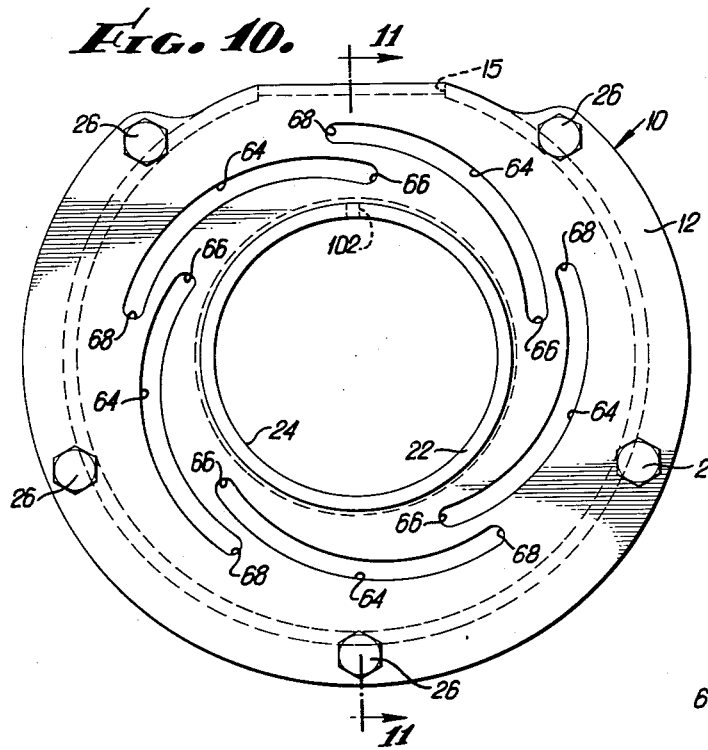
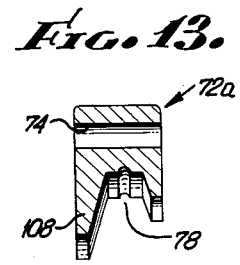
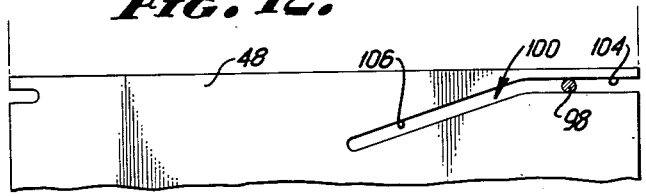
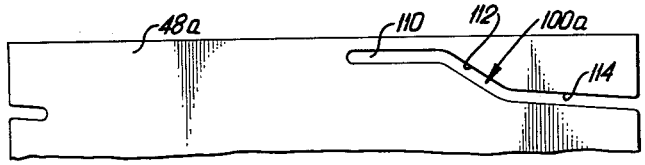
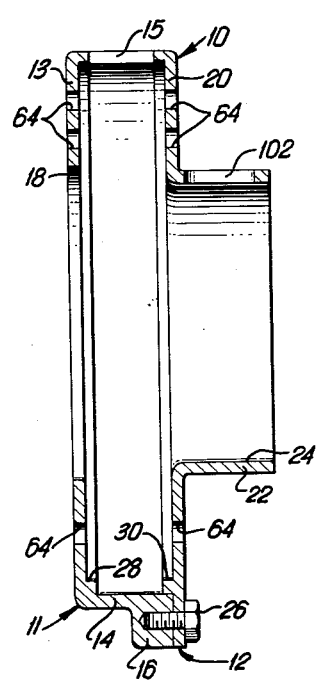
INVENTOR.
WILLIAM M. WILLIS
BY Huebner & Worrel
ATTORNEYS.

United States Patent Office 3,026,128
Patented Mar. 20, 1962

3,026,128
REMOTE OPERATIONAL JOINT COUPLING
William M. Willis, Northridge, Calif., assignor to Aeroquip Corporation, Jackson, Mich., a corporation of Michigan
Filed Apr. 21, 1960, Ser. No. 23,754
15 Claims. (Cl. 285—18)

The present invention relates to coupling devices for joining pipe sections, and it relates more particularly to such a coupling device which is suitable for sealing high internal pipe pressures and which is capable of being remotely operated, as where the joint is to be employed in regions of radiation contamination.

It is often necessary to provide for the coupling and uncoupling of pipe ends in inaccessible regions, such as in areas of radiation contamination, in which cases it is necessary to remotely operate a coupling device for coupling and uncoupling the pipe ends. Where conventional coupling devices are employed, it is difficult to obtain sufficient radial coupling force on the pipe ends to seal the joint against relatively high internal pipe pressures. It is also awkward and difficult to separate the pipe ends during the uncoupling operation where conventional coupling devices are employed, because it is usually necessary to first apply an axial separating force between the pipe sections to remove at least one pipe end from the coupling device, before the pipe sections may be moved out of axial alignment.

In view of these and other problems in the art, it is an object of the present invention to provide a pipe joint coupling device wherein a plurality of circumferentially arranged coupling segments are radially inwardly driven into coupling engagement over flanged pipe ends by cam action means having a relatively high mechanical advantage, whereby the pipe joint may be sealed against relatively high internal pipe pressures by the application of a relatively low driving force to the coupling, whereby the coupling device is particularly adapted for remote operation.

Another object of the present invention is to provide a coupling device of the character described which includes a cam action drive means for axially driving one of the pipe ends completely out of the coupling device, whereby separation of the pipe sections is facilitated.

Further objects and advantages of this invention will appear during the course of the following part of this specification, wherein the details of construction and mode of operation of a preferred embodiment are described with reference to the accompanying drawing, in which:

FIG. 1 is an end elevation view of the present invention;

FIG. 2 is a top plan view of the invention;

FIG. 3 is an axial section along the line 3—3 in FIG. 1;

FIG. 4 is a transverse or radial section along the line 4—4 in FIG. 3;

FIG. 5 is an elevation view, partly in section, illustrating the worm drive member of the present invention;

FIG. 6 is an elevation view illustrating one of the tube flange retainer segments of the present invention;

FIG. 7 is a sectional view along the line 7—7 of FIG. 6;

FIG. 8 is an end elevation view illustrating the internal worm gear ring member which rotates within the housing;

FIG. 9 is a fractional section along the line 9—9 in FIG. 8;

FIG. 10 is an end elevation view showing the housing portion of the present invention;

FIG. 11 is an axial section along the line 11—11 of FIG. 10 further illustrating the housing;

FIG. 12 is a schematic illustration of the axial sleeve portion of the ring member which rotates in the housing, developed on a flat surface for best illustrating the cam slot in the sleeve;

FIG. 13 is a sectional view similar to FIG. 7 illustrating a modified form of gripping segment;

FIG. 14 is a view similar to FIG. 12 illustrating an alternative form of the cam slot.

Referring to the drawings, the coupling device is embodied in a generally circular housing 10 adapted to be disposed over the ends of the pipe sections to be joined. The housing 10 includes a front housing section 11 and a rear housing section 12. The front housing section 11 comprises a flat front wall 13 disposed in a radial plane, with an arcuate peripheral wall 14 extending axially rearwardly from the outer peripheral edge of front wall 13. The peripheral wall 14 does not extend around the entire circumference of the housing, being interrupted at 15 for mounting of a worm element which extends into the inside of the housing in the manner hereinafter more fully described.

A radially outwardly projecting flange 16 is formed on the rear edge of the peripheral wall 14 for attachment of the rear housing section 12 to the front housing section 11.

The front wall 13 of housing section 11 is provided with a circular axial opening 18 sufficiently large to receive a flanged end of one of the pipe sections to be joined.

The rear housing section 12 includes a rear wall 20 disposed in a radial plane, and an integral axial sleeve portion 22 extending rearwardly from the inner edge of wall 20. The sleeve portion 22 has an inner cylindrical surface 24. The rear housing section 12 is attached to the front housing section 11 by means of a plurality of screws 26 which engage through wall 20 of the rear housing section into the flange 16 of the front housing section.

Spaced annular shoulders 28 and 30 of equal diameter are disposed in the respective housing sections 11 and 12 adjacent to the peripheral wall 14, the shoulders 28 and 30 serving as bearings for the rotatable mounting of a worm gear ring member 32 within the housing. The worm gear ring member 32 has peripheral worm gear teeth 34 which project radially outwardly between the housing shoulders 28 and 30, the ring member 32 having peripheral shoulders 36 and 38 on opposite sides of the worm gear teeth 34 which are journaled in the respective annular housing shoulders 28 and 30.

The ring member 32 has an annular recess 40 therein, thus to provide a generally flat front wall 42 and a generally flat rear wall 44, the inner surfaces of walls 42 and 44 being joined by a cylindrical surface 46.

The front wall 42 of ring member 32 extends radially inwardly to the same extent as the front wall 13 of the housing, the annular inner edges of the wall 42 and the housing wall 13 being coincident.

The rear wall 44 of the ring member 32 extends radially inwardly to a slightly smaller diameter than the rear housing wall 20, and is provided at its inner edge with an integral, rearwardly directed axial sleeve portion 48 which extends rearwardly within the housing sleeve portion 22, being rotatable therein. The housing sleeve 22 and the ring member sleeve portion 48 preferably have coincident rear end edges.

A worm mounting bracket 50 is integrally attached to the front housing section 11 so as to cover the opening 15 in the peripheral wall 14. A worm element 52 is mounted on a worm shaft 54 that is journaled in the mounting bracket 50. One end of the worm shaft 54 is provided with a tool gripping head 56.

The worm element 52 and shaft 54 are arranged tangentially relative to the peripheral worm gear teeth 34 on ring member 32, with the worm element 52 extending through the opening 15 in the housing wall for operative engagement of the worm element 52 with the worm gear teeth 34 on the ring member 32.

A plurality of pairs of identical, axially aligned cam slots 58 are provided in the respective walls 42 and 44 of the ring member 32. An odd number of pairs of the cam slots 58 is preferable in order to provide for self-aligning of the pipe sections in the coupling, five of these aligned pairs of cam slots 58 being shown in the accompanying drawings. The pairs of cam slots 58 are regularly spaced about the ring member 32.

Each pair of cam slots 58 extends circumferentially and radially outwardly from an inner end 60 to an outer end 62. Although the cam slots 58 illustrated in the drawings are arcuate in shape, they may be otherwise shaped if desired.

The rate of increase of the radius of the cam slots 58 between the inner and outer ends 60 and 62, respectively, will in part determine the mechanical advantage of the gripping action in the present device.

A plurality of pairs of identical, axially aligned cam slots 64 are provided in the respective walls 13 and 20 of housing 10, five pairs of these cam slots 64 being provided in regularly spaced relation about the housing 10. The housing cam slots 64 curve circumferentially and radially outwardly from inner ends 66 to outer ends 68, the housing cam slots 64 being of opposite "hand" to the cam slots 58 in the walls of ring member 32. Thus, while the cam slots 58 of ring member 32 spiral radially outwardly in a clockwise direction as viewed in FIGS. 1, 4 and 8, the cam slots 64 in the housing walls spiral radially outwardly in an anti-clockwise direction in FIGS. 1, 4 and 10.

The pitch or radial increase of the housing cam slots 64 is, like the oppositely directed rate of increase of the ring cam slots 58, an important factor in the amount of mechanical advantage available in the coupling device for radially engaging a pair of flanged pipe ends.

A plurality of axial bearing rods 70 are provided, one of the rods 70 passing axially through each of the pairs of housing cam slots 64 and a corresponding pair of ring cam slots 58. Thus, in the embodiment of the present invention illustrated in the drawings wherein five pairs of axially aligned housing cam slots 64 and five pairs of axially aligned ring cam slots 58 are provided, there will be five of the axial bearing rods 70. Each of the bearing rods 70 may be provided with enlarged head portions 71 at the respective ends thereof, outside of the housing walls 13 and 20, to retain the bearing rod in its axial position.

Tube flange retainer segments or jaws 72 are loosely pivotally mounted on the respective bearing rods 70 within the annular recess 40 of ring member 32, bearing rods 70 passing through respective axial passages 74 through the segments or jaws 72. Thus, in the embodiment of the present invention shown in the drawings, five of the segments 72 are regularly spaced in an annular array within the annular recess 40. An odd number of the segments 72 is provided for self-alignment of the pipe ends to be joined within the coupling device.

Each of the segments or jaws 72 has an arcuate inner gripping edge 76 having a groove 78 therein, the groove 78 having converging forward and rear gripping surfaces 80 and 82, respectively, for gripping respective flanged ends of the pipe sections to be joined. The segments 72 are radially outwardly biased by an expandable circular spring 84, which may be of the flat leaf or garter type. The circular spring 84 holds the segments 72 in a true circular arrangement regardless of the radial positioning of the segments, so that the segments will not dig into and damage the pipe end flanges as the segments are brought into gripping engagement with the flanges.

In order to further ensure that the gripping segments 72 are properly circularly aligned when in their fully retracted or outermost radial positions, it is preferred to provide radially outwardly extending positioning lugs 86 at the peripheral ends of the segments 72. The positioning lugs 86 will engage against the cylindrical inner surfaces 46 of the ring member 32 to thus align the segments 72 in their outermost radial positions.

The two pipe sections 88 and 90 which are to be connected by the present invention are provided with radially outwardly directed end flanges 92 and 94, respectively, these end flanges being adapted to abut against each other to form a high pressure seal when the flanges are engaged by the gripping segments 72. The pipe end flanges 92 and 94 may be of any desired type, such as the J-type shown in the drawings, or the type shown and described in copending application of James P. Reynolds and Hubert A. Dykstra, Serial No. 693,741, filed October 31, 1957, now Patent No. 2,992,840, for Coupled Joint.

The pipe section 88 is provided with a reinforcing collar 96 which is integrally attached to the outside of pipe section 88 adjacent to end flange 92 as by welding. A pin member 98 is integrally attached to pipe section 88 and reinforcing collar 96, projecting radially outwardly from the collar 96 as best shown in FIGS. 2 and 3. The pin 98 passes radially outwardly through a cam slot 100 in sleeve portion 48 of ring member 32, and through an axial slot 102 in the housing sleeve portion 22. In this manner, the coupling device is permanently mounted on the pipe section 88.

The cam slot 100 in the sleeve portion 48 of the ring member 32 preferably includes two portions of different pitch, a rearwardmost portion 104 which is circumferentially arranged, and a helical portion 106 which extends both circumferentially and at a substantial forward axial incline from one end of the circumferential portion 104 of slot 100.

When the two pipe sections 88 and 90 are fully coupled by the present coupling device, the gripping segments 72 are tightly engaged over the pipe end flanges 92 and 94 thus to wedge the flanges axially together. The desired amount of radially inwardly directed force of the gripping segments 72 against the flanges 92 and 94 is provided by rotating the worm element 52 so as to cause the worm gear ring member 32 to rotate clockwise in the housing 10 in FIGS. 1 and 4, thus to urge the bearing rods 70 which support the gripping segments 72 radially inwardly and clockwise in the housing cam slots 64, and radially inwardly and anti-clockwise in the ring member cam slots 58. In this fully engaged position of the gripping segments 72 over the pipe end flanges 92 and 94 as shown in FIG. 3, the pin member 98 will be in the circumferential portion 104 of the cam slot 100 in the ring sleeve portion 48, the pin member 98 being spaced a substantial distance circumferentially from the helical portion 106 of the slot 100.

The pipe sections are disengaged by rotating the worm element 52 so as to rotate the ring member 32 anti-clockwise within housing 10, thereby causing the bearing rods 70 which support the gripping segments 72 to ride radially outwardly in the housing cam slots 64 and in the ring member cam slots 58, thus moving the segments 72 radially outwardly out of engagement over the pipe end flanges 92 and 94. During this initial radially outwardly directed disengaging movement of the gripping segments 74, the pin member 98 will be engaged in the circumferential portion 104 of cam slot 100, so that rotation of the sleeve portion 48 of the ring member 32 within sleeve 22 of the housing will not cause axial movement of pin member 98, and hence of pipe section 88 relative to the housing.

When the gripping segments 72 have been cammed outwardly sufficiently to clear the end flanges 92 and 94 of the pipe sections, the ring sleeve portion 48 will have rotated sufficiently within the housing sleeve 22 so that pin member 98 will have reached the axially inclined portion 106 of the cam slot 100. Further rotation of the ring 32 within the housing will drive the pin member 98 axially forwardly in the inclined portion 106 of the cam slot, thereby driving the pipe section 88 axially forwardly through the housing. In this manner, continued actuation of the device to cause further relative expansion of the gripping segments 72 will cause the pipe section 88 to move forwardly through the housing to force the other pipe section 90 completely out of the housing in an axial direction. This leaves the removed pipe section 90 in such a completely disengaged position that it can be swung transversely out of axial alignment with the pipe section 88 without having to first be axially withdrawn from the joint by means separate and apart from the coupling device. It will be appreciated that this feature is of vital importance in the remote actuation of the joint coupling.

When the direction of rotation of the worm element 52 is reversed so as to rotate the ring member 32 anti-clockwise within the housing as viewed in FIGS. 1 and 4, the gripping segments 72 will again be cammed radially inwardly, and the pin member 98 will be cammed rearwardly in the inclined portion 106 of the cam slot 100 so as to again bring the end of pipe section 88 back into the housing, the end flange 92 of pipe section 88 being brought back into axial alignment with the gripping segments 72 before the segments 72 engage over the flange 92.

Although the presently preferred configuration for the cam slot 100 is that shown in the accompanying drawings and described above, it is to be understood that other shapes may be employed for the cam slot 100, thus to provide different movements of the pipe section 88 in the housing with respect to the movements of the gripping segments 72. For example, in some cases where a pipe joint includes a flexible annular element which tends to drive the pipe sections apart, so that it is necessary to bring the pipe sections together against a substantial separating force, it may, under some circumstances, be desirable to provide a cam slot which has a substantially different configuration. One example of such a pipe joint where it may be desirable to employ a cam slot of substantially different configuration is the "coupled joint" described and claimed in application of James P. Reynolds and Hubert A. Dykstra, Serial No. 693,741, filed October 31, 1957, previously referred to, wherein the pipe sections are urged apart by a frusto-conical, Belleville type washer.

In that case, it may be desirable to employ the axial movement of the pipe section 88 which is permanently attached in the coupling device to force the pipe ends axially together before the gripping segments are brought radially inwardly into the final coupling position. This may be accomplished by providing a pick-up lip 108, such as that shown in FIG. 13, which extends radially inwardly from the forward edge of each of the gripping segments 72a, and by providing a cam slot 100a like that shown in FIG. 14 having a configuration such that when the gripping segments are in their fully expanded, outermost radial positions, the pipe section 88 will be at a rearwardmost position rearwardly spaced from the position shown in FIG. 3. The removable pipe section 88 will then have its flanged end portion inserted in the coupling device, and the coupling device will be actuated to bring the segments 72a radially inwardly until the said pick-up lip 108 engages in front of the flange of the removable pipe section 90. During this initial inward movement of the gripping segments, the cam pin member 98 will be riding in a first portion 110 of the cam slot 100a which is circumferential.

Further actuation of the coupling to bring the gripping segments 72a radially inwardly will cam the pin member 98 rapidly forwardly in a relatively steep second portion 112 of the cam slot 100a which is forwardly axially inclined, whereby the pipe section 88 will be moved forwardly in the housing, or to the left in FIG. 3, thus to partially close the gap between the ends of the pipe sections. During the final radial inward movement of the gripping segments 72a to come into full gripping engagement with the flanges at the ends of the pipe sections, the pin member 98 will ride in a third portion 14 of the cam slot 100a which may be slightly forwardly axially inclined to assist the gripping surfaces 80 and 82 of the gripping segments 72a in completely closing the gap between the ends of the pipe sections.

It will be apparent that other shapes of the cam slot 100 may be employed for other purposes.

Although the present invention may thus be varied in the manner just described for closing the axial gap between the ends of the pipe sections where a resilient sealing member is employed that urges the pipe ends apart, as in the said "Coupled Joint" application, Serial No. 693,741, it is to be understood that the preferred embodiment of the present invention illustrated in the drawings may also be employed in connection with such joints as that shown and described in said application, Serial No. 693,741, either by externally axially urging the pipe sections together as they are engaged in the coupling device, or by providing sufficiently inclined gripping surfaces 80 and 82 within the gripping segments 72.

While the instant invention has been shown and described herein, in what is conceived to be the most practical and preferred embodiment, it is recognized that departures may be made therefrom within the scope of the invention, which is therefore not to be limited to the details disclosed herein, but is to be accorded the full scope of the claims.

What I claim is:

1. A coupling device for joining opposed, outwardly flanged ends of a pair of axially aligned pipe sections, said coupling device comprising: a housing having an opening therethrough and having a radially extending wall portion annularly disposed about said opening; a ring member rotatably mounted in said housing, said ring member having an opening therethrough axially aligned with said housing opening, and said ring member including a radially extending wall portion annularly disposed about said ring opening; a plurality of circularly arranged cam slots extending through said housing wall; a plurality of circularly arranged cam slots extending through said ring wall; a plurality of bearing members, each extending through one of said housing cam slots and one of said ring cam slots; a plurality of gripping segments mounted in said housing on the respective said bearing members, said gripping segments being radially movable between innermost positions in which they are engaged over the flanged pipe ends to couple the pipe sections together and outermost positions in which they are disengaged from the flanged pipe ends; and drive means engaged with said housing and said ring to impart relative rotation between said housing and said ring so as to cam said bearing members in said cam slots and thereby radially move said gripping segments.

2. A coupling device as defined in claim 1 wherein said drive means includes a plurality of worm gear teeth circumferentially arranged on said ring member, and a worm drive element rotatably mounted on said housing, said worm element being engaged with said worm gear teeth.

3. A coupling device as defined in claim 1 wherein said housing cam slots spiral in one direction circumferentially and radially outwardly from inner ends to outer ends, and wherein said ring cam slots spiral in the opposite direction circumferentially and radially outwardly from inner ends to outer ends, said housing and ring cam slots being of opposite "hand."

4. A coupling device as defined in claim 1 which includes: a housing sleeve mounted on said housing so as to extend axially of the housing; a ring sleeve mounted on said ring so as to extend axially of the ring member, said ring sleeve being positioned axially within said housing sleeve and being adapted for axial engagement over one of said pipe sections adjacent its flanged end; a cam slot extending through one of said sleeves, and a coupling slot extending through the other said sleeve; a pin member adapted to be attached to said pipe section that is engaged in said ring sleeve, said pin member extending radially outwardly through said slots in the respective sleeves; relative rotation between said housing and said ring member causing said pin member to be cammed in said sleeve cam slot whereby to impart axial movement to said pin and said pipe section to which the pin is attached relative to said housing and said ring member.

5. A coupling device as defined in claim 4 wherein said sleeve cam slot has two connected portions of different axial pitch.

6. A coupling device as defined in claim 4 wherein said sleeve cam slot is in said ring sleeve and said coupling slot is in said housing sleeve.

7. A coupling device for joining opposed, outwardly flanged ends of a pair of axially aligned pipe sections, said coupling device comprising: an annular housing having an axial opening therethrough and having a pair of axially spaced walls; a ring member rotatably mounted in said housing between said housing walls, said ring member having a pair of axially spaced walls positioned adjacent to the respective said housing walls; a plurality of circularly arranged pairs of axially aligned cam slots extending through said housing walls; a plurality of circularly arranged pairs of axially aligned cam slots extending through said ring walls; a plurality of axial bearing rods, each rod extending through a pair of said housing cam slots and a pair of said ring cam slots; a plurality of gripping segments mounted on the respective said rods between said spaced ring walls, said gripping segments being radially movable between innermost positions in which they are engaged over the flanged pipe ends to couple the pipe sections together and outermost positions in which they are disengaged from the flanged pipe ends; and drive means engaged with said housing and said ring to impart relative rotation between said housing and said ring so as to cam said bearing rods in said cam slots and thereby radially move said gripping segments.

8. A coupling device as defined in claim 7 wherein said drive means includes a plurality of worm gear teeth circumferentiaally arranged on said ring member, and a worm drive element rotatably mounted on said housing, said worm element being engaged with said worm gear teeth.

9. A coupling device as defined in claim 7 wherein said housing cam slots spiral in one direction circumferentially and radially outwardly from inner ends to outer ends, and wherein said ring cam slots spiral in the opposite direction circumferentially and radially outwardly from inner ends to outer ends, said housing and ring cam slots being of opposite "hand."

10. A coupling device for joining opposed, outwardly flanged ends of a pair of axially aligned pipe sections, said coupling device comprising: an annular housing having an axial opening therethrough, and having axially spaced front and rear walls, said housing having an axial sleeve portion extending rearwardly from said rear housing wall; a ring member rotatably mounted in said housing between said housing walls, said ring member having a pair of axially spaced walls positioned adjacent to the respective said housing walls, said ring member having an axial sleeve portion extending rearwardly from said rear ring wall and positioned axially within said housing sleeve portion, said ring sleeve portion being adapted for axial engagement over one of said pipe sections adjacent its flanged end; a plurality of circularly arranged pairs of axially aligned cam slots extending through said housing walls; a plurality of circularly arranged pairs of axially aligned cam slots extending through said ring walls; a plurality of bearing members, each of which extends through a pair of said housing cam slots and a pair of said ring cam slots; a plurality of gripping segments on the respective said bearing members between said spaced ring walls, said gripping segments being radially movable between innermost positions in which they are engaged over the flanged pipe ends to couple the pipe sections together and outermost positions in which they are disengaged from the flanged pipe ends; a cam slot extending through one of said sleeve portions, and a coupling slot through the other said sleeve portion; a pin member adapted to be attached to said pipe section that is engaged in said ring sleeve portion, said pin member extending radially outwardly through said slots in the respective sleeves; and drive means engaged with said housing and said ring to impart relative rotation between said housing and said ring so as to cam said bearing members in the cam slots and thereby radially move said gripping segments, and so as to cam said pin member in said sleeve cam slot and thereby impart axial movement to said pin and said pipe section to which the pin is attached relative to said housing and said ring member.

11. A coupling device as defined in cliam 10 wherein said sleeve cam slot is in said ring sleeve portion and said coupling slot is in said housing sleeve portion.

12. A coupling device as defined in claim 10 wherein said sleeve cam slot has two connected portions of different axial pitch.

13. A coupling device as defined in claim 12 wherein one of said sleeve cam slot portions is circumferential so that relative rotation between said housing and ring members to cause disengaging movement of said gripping segments from their engaged positions over the flanged pipe ends will not cause axial movement of the pipe segments; and the other of said sleeve cam slot portions is axially inclined so that further relative rotation between said housing and ring members after disengagement of said gripping segments from said flanged pipe ends will cam said pin and the pipe section to which it is attached forwardly in said device, thereby driving the other pipe section completely out of the device.

14. A coupling device as defined in claim 12 wherein said drive means includes a plurality of worm gear teeth circumferentially arranged on said ring member, and a worm drive element rotatably mounted on said housing, said worm element being engaged with said worm gear teeth.

15. A coupling device as defined in claim 12 wherein said housing cam slots spiral in one direction circumferentially and radially outwardly from inner ends to outer ends, and wherein said ring cam slots spiral in the opposite direction circumferentially and radially outwardly from inner ends to outer ends, said housing and ring cam slots being of opposite "hand."

References Cited in the file of this patent
UNITED STATES PATENTS

| | | |
|---|---|---|
| 351,871 | Lampert | Nov. 2, 1886 |
| 1,488,221 | Swissgabel | Mar. 25, 1924 |

FOREIGN PATENTS

| | | |
|---|---|---|
| 25,808 | Great Britain | Nov. 30, 1908 |